US012494577B2

(12) United States Patent
Pu et al.

(10) Patent No.: US 12,494,577 B2
(45) Date of Patent: Dec. 9, 2025

(54) COMMUNICATION DEVICE AND COMMUNICATION METHOD

(71) Applicant: HTC Corporation, Taoyuan (TW)

(72) Inventors: Ta-Chun Pu, Taoyuan (TW); Chun-Yih Wu, Taoyuan (TW); Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 121 days.

(21) Appl. No.: 18/418,495

(22) Filed: Jan. 22, 2024

(65) Prior Publication Data

US 2025/0202111 A1 Jun. 19, 2025

(30) Foreign Application Priority Data

Dec. 14, 2023 (TW) ................................ 112148720

(51) Int. Cl.

*H01Q 3/44* (2006.01)
*H01Q 3/26* (2006.01)
*H01Q 15/00* (2006.01)
*H01Q 1/24* (2006.01)

(52) U.S. Cl.

CPC ................. *H01Q 3/44* (2013.01); *H01Q 3/26* (2013.01); *H01Q 15/0006* (2013.01); *H01Q 1/246* (2013.01)

(58) Field of Classification Search

CPC ............ H01Q 1/246; H01Q 3/26; H01Q 3/44; H01Q 15/0006

See application file for complete search history.

(56) References Cited

U.S. PATENT DOCUMENTS

2008/0284674 A1* 11/2008 Herz .................... H01Q 21/065 343/909
2022/0006184 A1 1/2022 Judd

FOREIGN PATENT DOCUMENTS

WO WO-2007096644 A1 * 8/2007 ............... H01Q 3/46

OTHER PUBLICATIONS

Taiwanese Office Action and Search Report for Taiwanese Application No. 112148720, dated Aug. 29, 2024, with a partial English translation.

* cited by examiner

*Primary Examiner* — Hoang V Nguyen
(74) *Attorney, Agent, or Firm* — Birch, Stewart, Kolasch & Birch, LLP

(57) ABSTRACT

A communication device includes a sheet structure. The sheet structure includes a plurality of metal units and a plurality of interconnection units. The interconnection units are coupled to the metal units, and are interleaved with the metal units. The interconnection units are controlled according to a plurality of control signals. In response to a first incident wave, the sheet structure can generate a first reflection wave and a first transmission wave.

19 Claims, 9 Drawing Sheets

COMMUNICATION DEVICE AND COMMUNICATION METHOD

CROSS REFERENCE TO RELATED APPLICATIONS

This application claims priority of Taiwan Patent Application No. 112148720 filed on Dec. 14, 2023, the entirety of which is incorporated by reference herein.

BACKGROUND OF THE INVENTION

Field of the Invention

The invention relates to a communication device, and more particularly, to a communication device and a communication method.

Description of the Related Art

In the field of mobile communications, because of large propagation loss of high-frequency electromagnetic waves, it is necessary to build more active base stations. However, these active base stations may raise the power consumption, and their overall manufacturing cost may be very high. Accordingly, there is a need to propose a novel solution for solving the problem of the prior art.

BRIEF SUMMARY OF THE INVENTION

In an exemplary embodiment, the invention is directed to a communication device that includes a sheet structure. The sheet structure includes a plurality of metal units and a plurality of interconnection units. The interconnection units are coupled to the metal units, and are interleaved with the metal units. The interconnection units are controlled according to a plurality of control signals. In response to a first incident wave, the sheet structure generates a first reflection wave and a first transmission wave.

In some embodiments, the sheet structure has an operational frequency band from 30 GHz to 300 GHz.

In some embodiments, the first reflection ratio and the first reflection angle of the first reflection wave are adjustable according to the control signals.

In some embodiments, the first transmission ratio and the first transmission angle of the first transmission wave are adjustable according to the control signals.

In some embodiments, in response to a second incident wave, the sheet structure further generates a second reflection wave and a second transmission wave.

In some embodiments, the sheet structure is divided into a first region and a second region. The second region is different from the first region.

In some embodiments, when the first region receives the first incident wave, the first region correspondingly outputs the first reflection wave and the first transmission wave.

In some embodiments, when the second region receives the second incident wave, the second region correspondingly outputs the second reflection wave and the second transmission wave.

In some embodiments, the second reflection ratio and the second reflection angle of the second reflection wave are adjustable according to the control signals.

In some embodiments, the second transmission ratio and the second transmission angle of the second transmission wave are adjustable according to the control signals.

In some embodiments, each of the metal units includes a main metal element and a plurality of connection terminals. The main metal element is substantially surrounded by the connection terminals.

In some embodiments, the connection terminals are directly coupled to the main metal element.

In some embodiments, the connection terminals are adjacent to the main metal element, and do not directly touch the main metal element.

In some embodiments, each of the interconnection units includes one or more circuit elements and a plurality of interconnection terminals. The interconnection terminals are coupled to the circuit elements.

In some embodiments, the circuit elements include a switch element.

In some embodiments, the circuit elements include a variable capacitor.

In some embodiments, the circuit elements include a tunable impedance circuit.

In some embodiments, the circuit elements include a passive element.

In some embodiments, the passive element is made of a dielectric material.

In another exemplary embodiment, the invention is directed to a communication method that includes the steps of: providing a sheet structure, wherein the sheet structure includes a plurality of metal units and a plurality of interconnection units, and the interconnection units are coupled to the metal units and are interleaved with the metal units; controlling the interconnection units according to a plurality of control signals; and in response to a first incident wave, generating a first reflection wave and a first transmission wave by the sheet structure.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
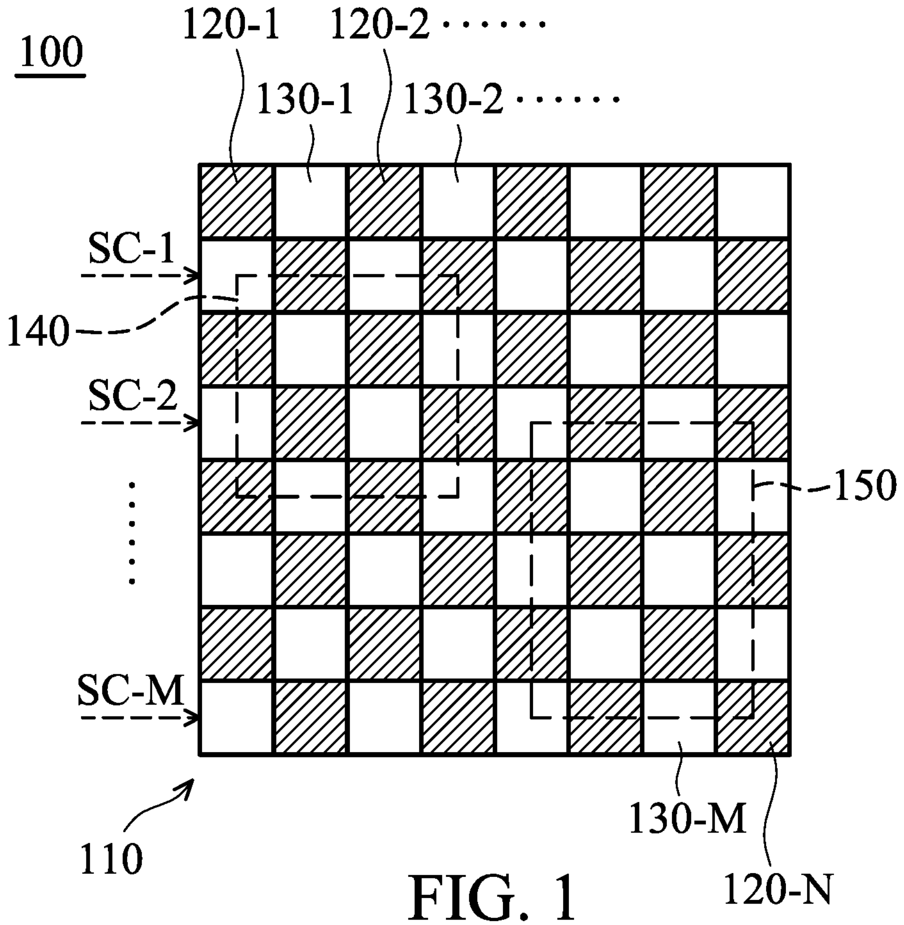
FIG. 1 is a top view of a communication device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. An electrical connection may be a capacitive connection or an inductive connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of a communication device 100 according to an embodiment of the invention. For example, the communication device 100 may be applied in an environment for signal transmission, but it is not limited thereto. In the embodiment of FIG. 1, the communication device 100 at least includes a sheet structure 110. It should be understood that the communication device 100 may further include other components, such as a nonconductive housing, a controller, and/or a power supply module, although they are not displayed in FIG. 1.

As shown in FIG. 1, the sheet structure 110 includes a plurality of metal units 120-1, 120-2, . . . , and 120-N and a plurality of interconnection units 130-1, 130-2, . . . , and 130-M, where "N" and "M" may be integers greater than or equal to 4. The interconnection units 130-1, 130-2, . . . , and 130-M are coupled to the metal units 120-1, 120-2, . . . , and 120-N, and are interleaved with the metal units 120-1, 120-2, . . . , and 120-N. For example, each metal unit may be coupled to four adjacent interconnection units, and each interconnection unit may be coupled to four adjacent metal units, but they are not limited thereto. The interconnection units 130-1, 130-2, . . . , and 130-M are controlled according to a plurality of control signals SC-1, SC-2, . . . , and SC-M. In some embodiments, the control signals SC-1, SC-2, . . . , and SC-M are generated by a controller, and they are used to adjust the operational characteristics of the interconnection units 130-1, 130-2, . . . , and 130-M.

In some embodiments, the sheet structure 110 has an operational frequency band from 30 GHz to 300 GHz. Therefore, the communication device 100 can support at least the wideband operations of mmWave (Millimeter Wave).

In some embodiments, the sheet structure 110 is divided into a first region 140 and a second region 150, and the second region 150 is different from the first region 140. It should be understood that the shapes and sizes of the first region 140 and the second region 150 are not limited in the invention. In alternative embodiments, the sheet structure 110 can be further divided into more regions.

Figure 2:
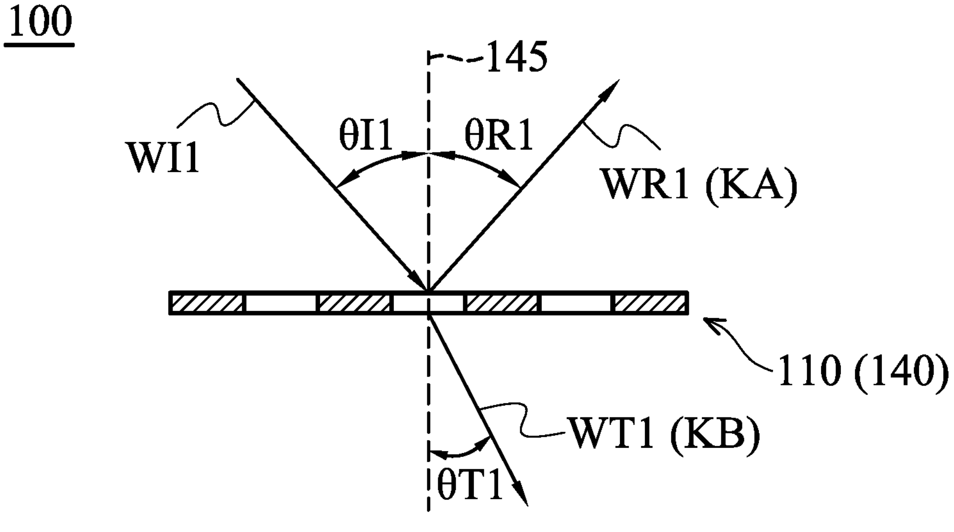
FIG. 2 is a side view of a communication device according to an embodiment of the invention.

FIG. 2 is a side view of the communication device 100 according to an embodiment of the invention. In the embodiment of FIG. 2, the first region 140 of the sheet structure 110 has a first normal line 145. In response to a first incident wave WI1, the sheet structure 110 can generate a first reflection wave WR1 and a first transmission wave WT1. Specifically, when the first region 140 of the sheet structure 110 receives the first incident wave WI1, the first region 140 of the sheet structure 110 can correspondingly output the first reflection wave WR1 and the first transmission wave WT1. With respect to the first normal line 145, the first incident wave WI1 has a first incident angle θI1, the first reflection wave WR1 has a first reflection angle θR1, and the first transmission wave WT1 has a first transmission angle θT1. On the other hand, the first reflection ratio KA of the first reflection wave WR1 and the first transmission ratio KB of the first transmission wave WT1 can be determined using the following equations (1), (2) and (3):

$$KA = \frac{WR1}{WI1} \tag{1}$$

$$KB = \frac{WT1}{WI1} \tag{2}$$

$$KA + KB \leq 1 \tag{3}$$

where "KA" represents the first reflection ratio KA, "KB" represents the first transmission ratio KB, "WI1" represents the radiation energy of the first incident wave WI1, "WR1" represents the radiation energy of the first reflection wave WR1, and "WT1" represents the radiation energy of the first transmission wave WT1.

Because a non-ideal loss usually exists in the sheet structure 110, the sum of the first reflection ratio KA and the first transmission ratio KB should be smaller than or equal to 1. It should be noted that the first reflection ratio KA and the first reflection angle θR1 of the first reflection wave WR1 are adjustable according to the control signals SC-1, SC-2, . . . , and SC-M. Also, the first transmission ratio KB and the first transmission angle θT1 of the first transmission wave WT1 are adjustable according to the control signals SC-1, SC-2, . . . , and SC-M.

Figure 3:
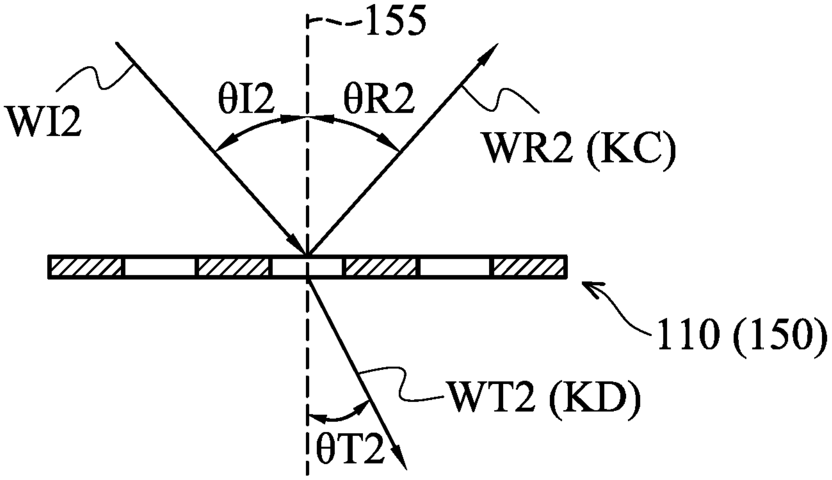
FIG. 3 is a side view of a communication device according to an embodiment of the invention.

FIG. 3 is a side view of the communication device 100 according to an embodiment of the invention. In the embodiment of FIG. 3, the second region 150 of the sheet structure 110 has a second normal line 155. In response to a second incident wave WI2, the sheet structure 110 can generate a second reflection wave WR2 and a second transmission wave WT2. Specifically, when the second region 150 of the sheet structure 110 receives the second incident wave WI2, the second region 150 of the sheet structure 110 can correspondingly output the second reflection wave WR2 and the second transmission wave WT2. With respect to the second normal line 155, the second incident wave WI2 has a second incident angle θI2, the second reflection wave WR2 has a second reflection angle θR2, and the second transmission wave WT2 has a second transmission angle θT2. On the other hand, a second reflection ratio KC of the second reflection wave WR2 and a second transmission ratio KD of the second transmission wave WT2 can be determined using the following equations (4), (5) and (6):

$$KC = \frac{WR2}{WI2} \tag{4}$$

$$KD = \frac{WT2}{WI2} \tag{5}$$

$$KC + KD \leq 1 \tag{6}$$

where "KC" represents the second reflection ratio KC, "KD" represents the second transmission ratio KD, "WI2" represents the radiation energy of the second incident wave WI2, "WR2" represents the radiation energy of the second reflection wave WR2, and "WT2" represents the radiation energy of the second transmission wave WT2.

Because the non-ideal loss usually exists in the sheet structure 110, the sum of the second reflection ratio KC and the second transmission ratio KD should be smaller than or equal to 1. It should be noted that the second reflection ratio KC and the second reflection angle θR2 of the second reflection wave WR2 are adjustable according to the control signals SC-1, SC-2, . . . , and SC-M. Also, the second transmission ratio KD and the second transmission angle θT2 of the second transmission wave WT2 are adjustable according to the control signals SC-1, SC-2, . . . , and SC-M.

With the proposed design of the invention, the radiation characteristics of the reflection waves and transmission waves of the communication device 100 can be appropriately adjusted by using the sheet structure 110. In addition, since the sheet structure 110 is divided into multiple regions, it can process incident waves in a variety of directions at the same time. In conclusion, the communication device 100 of the invention is configured to replace conventional active base stations and maintain good transmission quality of high-frequency signals.

In alternative embodiments, the sheet structure 110 of the communication device 100 is modified to a 3D (Three-Dimensional) structure, such that the metal units 120-1, 120-2, . . . , and 120-N are stacked up with the interconnection units 130-1, 130-2, . . . , and 130-M. This can also provide similar performance.

The following embodiments will introduce different configurations and detail structural features of the communication device 100. It should be understood that these figures and descriptions are merely exemplary, rather than limitations of the invention.

Figure 4A:
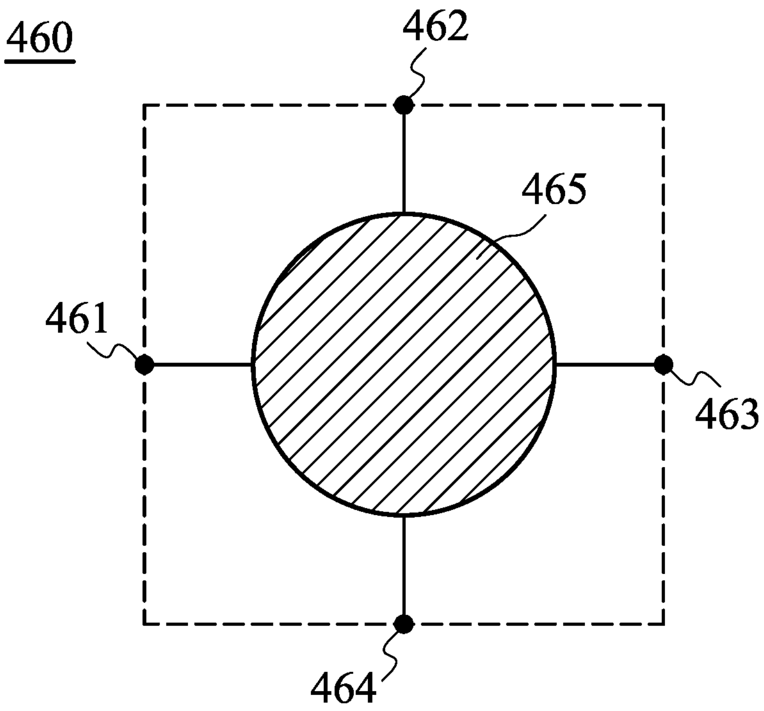
FIG. 4A is a diagram of a metal unit according to an embodiment of the invention.

FIG. 4A is a diagram of a metal unit 460 according to an embodiment of the invention. In the embodiment of FIG. 4A, the metal unit 460 includes a plurality of connection terminals 461, 462, 463 and 464 and a main metal element 465. For example, the main metal element 465 may substantially have a circular shape, a square shape, a regular triangular shape, or a regular hexagonal shape, but it is not limited thereto. The main metal element 465 is substantially surrounded by the connection terminals 461, 462, 463 and 464. Specifically, the connection terminals 461, 462, 463 and 464 are directly coupled to the main metal element 465. However, the invention is not limited thereto. In alternative embodiments, the metal unit 460 includes fewer or more connection terminals.

Figure 4B:
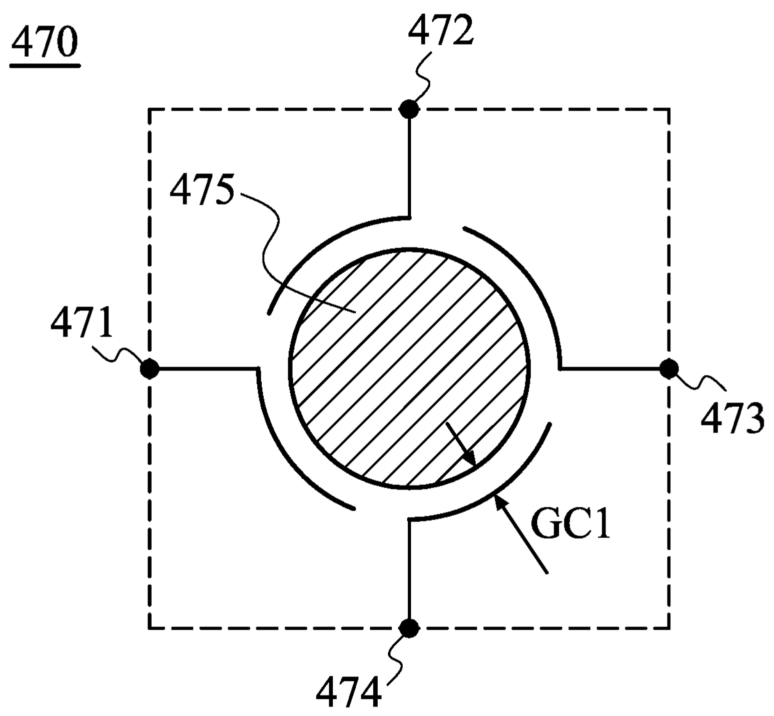
FIG. 4B is a diagram of a metal unit according to an embodiment of the invention.

FIG. 4B is a diagram of a metal unit 470 according to an embodiment of the invention. In the embodiment of FIG. 4B, the metal unit 470 includes a plurality of connection terminals 471, 472, 473 and 474 and a main metal element 475. The main metal element 475 is substantially surrounded by the connection terminals 471, 472, 473 and 474. Specifically, the connection terminals 471, 472, 473 and 474 are adjacent to the main metal element 475, and do not directly touch the main metal element 475. For example, a respective coupling gap GC1 may be formed between the main metal element 475 and each of the connection terminals 471, 472, 473 and 474. It should be noted that the term "adjacent" or "close" over the disclosure means that the distance (spacing) between two corresponding elements is shorter than a predetermined distance (e.g., 10 mm or shorter), but often does not mean that the two corresponding elements are touching each other directly (i.e., the aforementioned distance/spacing therebetween is reduced to 0).

Figure 4C:
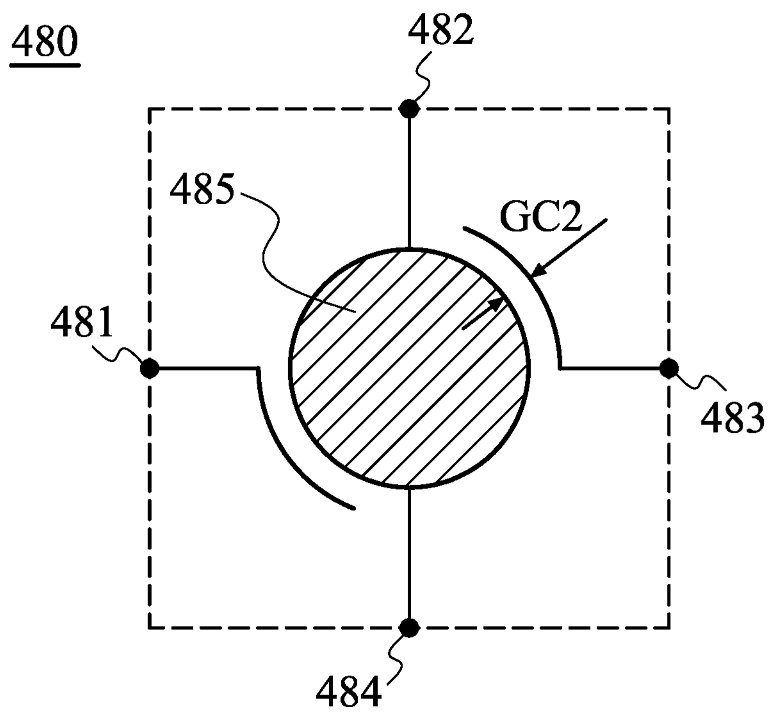
FIG. 4C is a diagram of a metal unit according to an embodiment of the invention.

FIG. 4C is a diagram of a metal unit 480 according to an embodiment of the invention. In the embodiment of FIG. 4C, the metal unit 480 includes a plurality of connection terminals 481, 482, 483 and 484 and a main metal element 485. The main metal element 485 is substantially surrounded by the connection terminals 481, 482, 483 and 484. Specifically, the connection terminals 482 and 484 are directly coupled to the main metal element 485. The connection terminals 481 and 483 are adjacent to the main metal element 485, and do not directly touch the main metal element 485. For example, a respective coupling gap GC2 may be formed between the main metal element 485 and each of the connection terminals 481 and 483. It should be understood that each connection terminal as mentioned above may be made of a metal material.

Figure 5A:
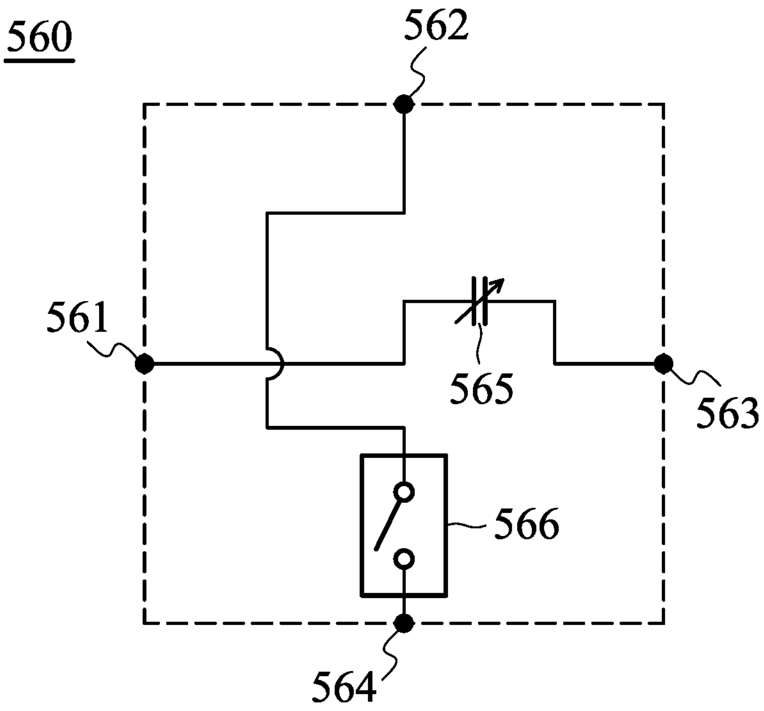
FIG. 5A is a diagram of an interconnection unit according to an embodiment of the invention.

FIG. 5A is a diagram of an interconnection unit 560 according to an embodiment of the invention. In the embodiment of FIG. 5A, the interconnection unit 560 includes a plurality of interconnection terminals 561, 562, 563 and 564, a variable capacitor 565, and a switch element 566. The variable capacitor 565 and the switch element 566 may be considered as circuit elements of the interconnection unit 560. It should be understood that each interconnection terminal of the interconnection unit 560 can be coupled to a corresponding connection terminal of any metal unit. Specifically, the variable capacitor 565 has a first terminal and a second terminal. The first terminal of the variable capacitor 565 is coupled to the interconnection terminal 561. The second terminal of the variable capacitor 565 is coupled to the interconnection terminal 563. The capacitance of the variable capacitor 565 is adjustable according to a control signal. The switch element 566 has a first terminal and a second terminal. The first terminal of the switch element 566 is coupled to the interconnection terminal 562. The second terminal of the switch element 566 is coupled to the interconnection terminal 564. The switch element 566 is selectively closed or opened according to another control signal. However, the invention is not limited thereto. In alternative embodiments, the interconnection unit 560 includes one or more circuit elements of other types.

Figure 5B:
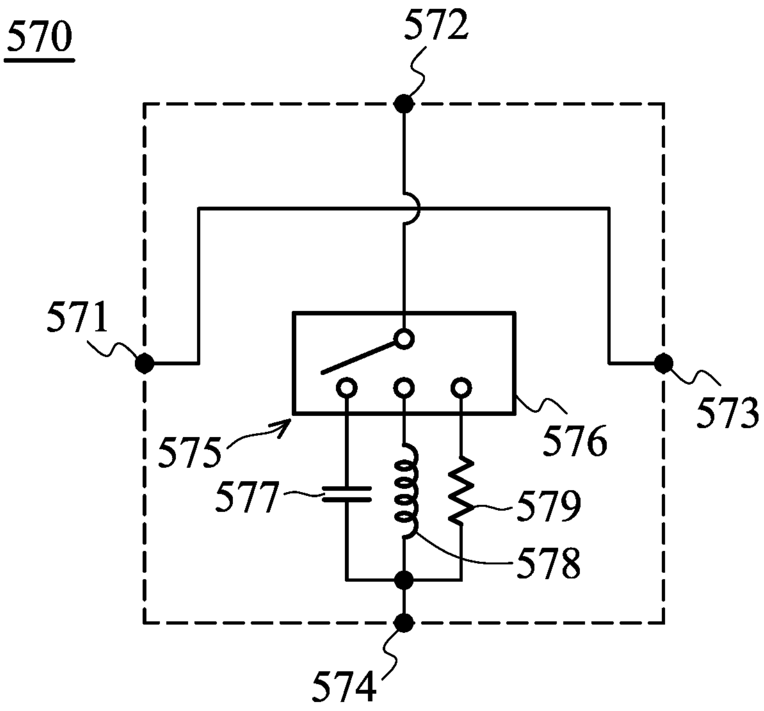
FIG. 5B is a diagram of an interconnection unit according to an embodiment of the invention.

FIG. 5B is a diagram of an interconnection unit 570 according to an embodiment of the invention. In the embodiment of FIG. 5B, the interconnection unit 570 includes a plurality of interconnection terminals 571, 572, 573 and 574, and a tunable impedance circuit 575. The interconnection terminals 571 and 573 are directly coupled to each other. Specifically, the tunable impedance circuit 575 includes a selection circuit 576, a capacitive path 577, an inductive path 578, and a resistive path 579. The selection circuit 576 has a first terminal and a second terminal. The first terminal of the selection circuit 576 is coupled to the interconnection terminal 572. The second terminal of the selection circuit 576 is switchable between the capacitive path 577, the inductive path 578, and the resistive path 579 according to a control signal. The capacitive path 577, the inductive path 578, and the resistive path 579 are all coupled to the interconnection terminal 574. In other words, the interconnection terminal 572 is coupled through the path selected by the selection circuit 576 to the interconnection terminal 574. However, the invention is not limited thereto. In alternative embodiments, the interconnection unit 570 includes one or more circuit elements of other types.

Figure 5C:
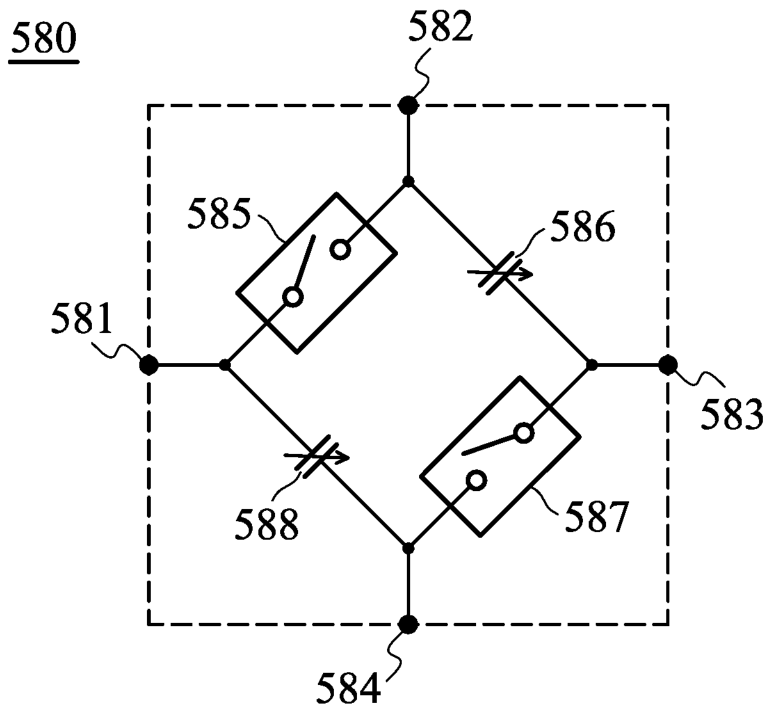
FIG. 5C is a diagram of an interconnection unit according to an embodiment of the invention.

FIG. 5C is a diagram of an interconnection unit 580 according to an embodiment of the invention. In the embodiment of FIG. 5C, the interconnection unit 580 includes a plurality of interconnection terminals 581, 582, 583 and 584, a first switch element 585, a first variable capacitor 586, a second switch element 587, and a second variable capacitor 588. The first switch element 585 has a first terminal and a second terminal. The first terminal of the first switch element 585 is coupled to the interconnection terminal 581. The second terminal of the first switch element 585 is coupled to the interconnection terminal 582. The first variable capacitor 586 has a first terminal and a second terminal. The first terminal of the first variable capacitor 586 is coupled to the interconnection terminal 582. The second terminal of the first variable capacitor 586 is coupled to the interconnection terminal 583. The second switch element 587 has a first terminal and a second terminal. The first terminal of the second switch element 587 is coupled to the interconnection terminal 583. The second terminal of the second switch element 587 is coupled to the interconnection terminal 584. The second variable capacitor 588 has a first terminal and a second terminal. The first terminal of the second variable capacitor 588 is coupled to the interconnection terminal 581. The second terminal of the second variable capacitor 588 is coupled to the interconnection terminal 584. The first switch element 585 and the second switch element 587 are selectively closed or opened according to a control signal. The capacitances of the first variable capacitor 586 and the second variable capacitor 588 are adjustable according to another control signal. However, the invention is not limited thereto. In alternative embodiments, the interconnection unit 580 includes one or more circuit elements of other types.

Figure 5D:
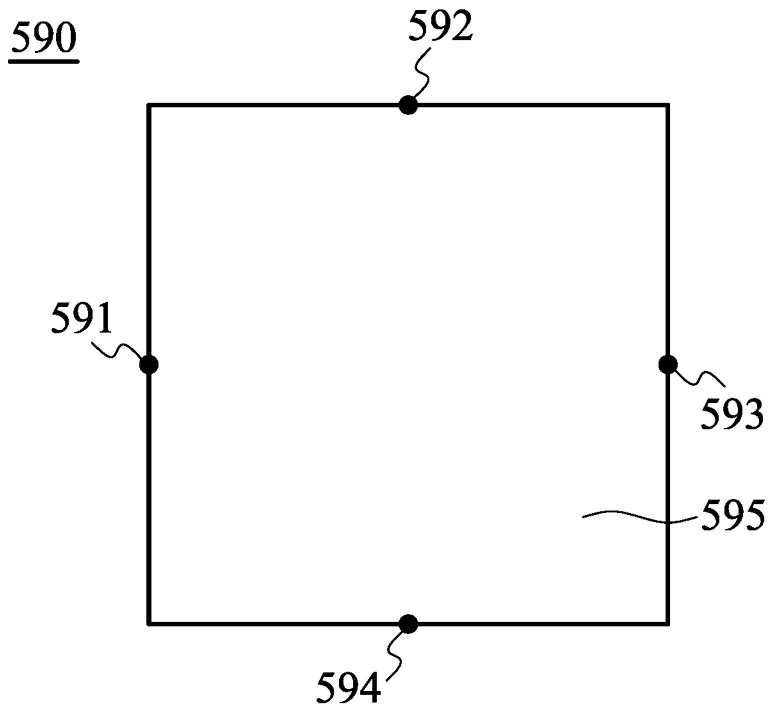
FIG. 5D is a diagram of an interconnection unit according to an embodiment of the invention.

FIG. 5D is a diagram of an interconnection unit 590 according to an embodiment of the invention. In the embodiment of FIG. 5D, the interconnection unit 590 includes a plurality of interconnection terminals 591, 592, 593 and 594, and a passive element 595. The passive element 595 is connected between the interconnection terminals 591, 592, 593 and 594. For example, the passive element 595 may be made of a dielectric material, but it is not limited thereto. In alternative embodiments, the passive element 595 is replaced with a capacitive element, an inductive element, or a resistive element. It should be understood that each interconnection terminal as mentioned above may be made of a metal material.

Figure 6:
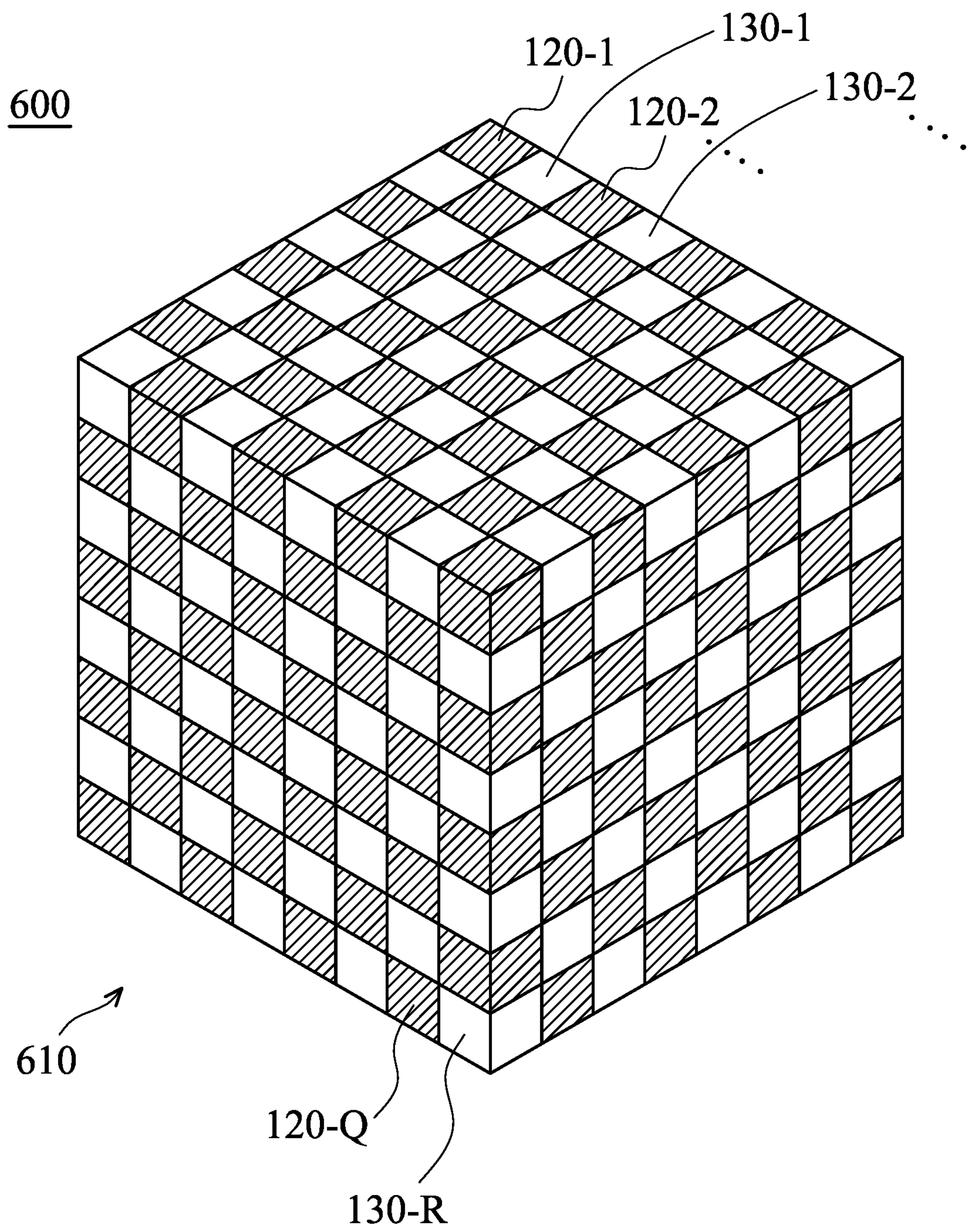
FIG. 6 is a perspective view of a communication device according to an embodiment of the invention.

FIG. 6 is a perspective view of a communication device 600 according to an embodiment of the invention. In the embodiment of FIG. 6, the communication device 600 includes a plurality of sheet structures, so as to form a 3D combinational structure. Specifically, the aforementioned 3D combinational structure includes a plurality of metal units 120-1, 120-2, . . . , and 120-Q and a plurality of interconnection units 130-1, 130-2, . . . , and 130-R, where “Q” and “R” may be integers greater than or equal to 16. The interconnection units 130-1, 130-2, . . . , and 130-R are coupled to the metal units 120-1, 120-2, . . . , and 120-Q, and are interleaved with the metal units 120-1, 120-2, . . . , and 120-Q. For example, each metal unit may be coupled to six adjacent interconnection units, and each interconnection unit may be coupled to six adjacent metal units, but they are not limited thereto. The interconnection units 130-1, 130-2, . . . , and 130-R are controlled according to a plurality of control signals (not shown).

Figure 7A:
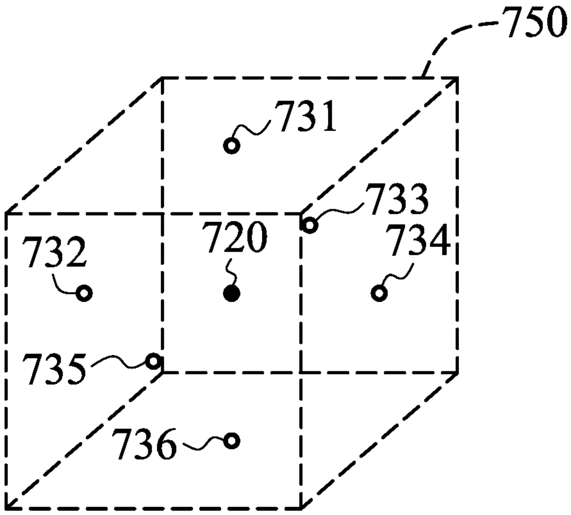
FIG. 7A is a perspective view of a six-point interconnection according to an embodiment of the invention.

FIG. 7A is a perspective view of a six-point interconnection according to an embodiment of the invention. In the embodiment of FIG. 7A, if a metal unit 720 is positioned at the center of a virtual cube 750, there will be six interconnection units 731, 732, 733, 734, 735 and 736 positioned at six central points of six surfaces of the virtual cube 750, respectively. The interconnection units 731, 732, 733, 734, 735 and 736 are all coupled to the metal unit 720. In addition, the other metal units and the other interconnection units may be periodically arranged in a similar way, but they are not limited thereto.

Figure 7B:
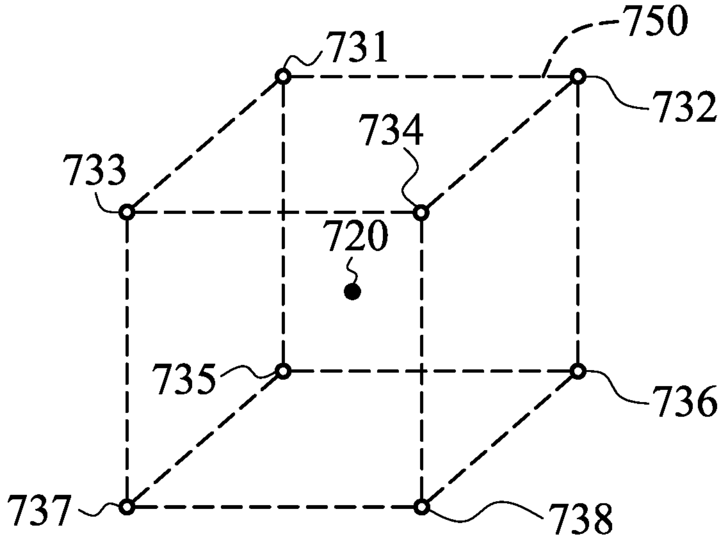
FIG. 7B is a perspective view of an eight-point interconnection according to an embodiment of the invention.

FIG. 7B is a perspective view of an eight-point interconnection according to an embodiment of the invention. In the embodiment of FIG. 7B, if a metal unit 720 is positioned at the center of a virtual cube 750, there will be eight interconnection units 731, 732, 733, 734, 735, 736, 737 and 738 positioned at the eight vertexes of the virtual cube 750, respectively. The interconnection units 731, 732, 733, 734, 735, 736, 737 and 738 are all coupled to the metal unit 720. In addition, the other metal units and the other interconnection units may be periodically arranged in a similar way, but they are not limited thereto.

Figure 8A:
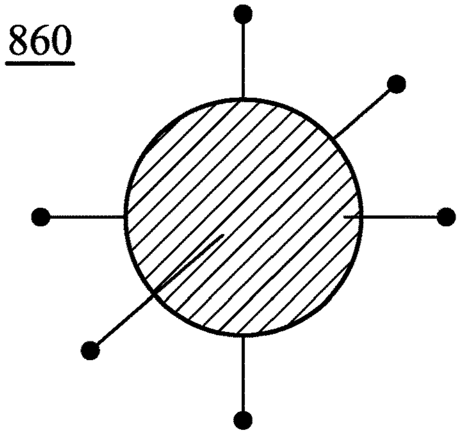
FIG. 8A is a perspective view of a metal unit according to an embodiment of the invention.
Figure 8B:
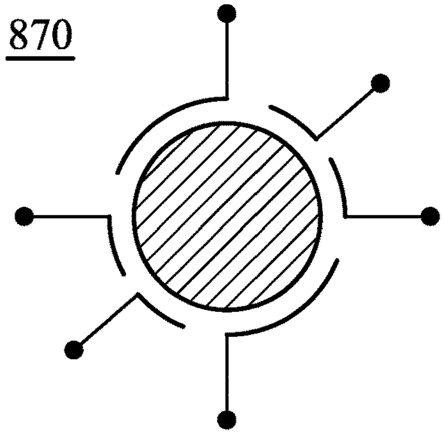
FIG. 8B is a perspective view of a metal unit according to an embodiment of the invention.
Figure 8C:
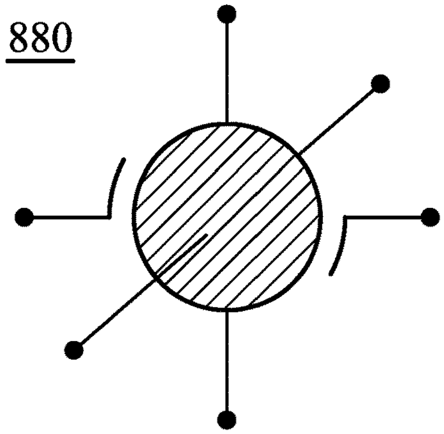
FIG. 8C is a perspective view of a metal unit according to an embodiment of the invention.

FIG. 8A is a perspective view of a metal unit 860 according to an embodiment of the invention. FIG. 8B is a perspective view of a metal unit 870 according to an embodiment of the invention. FIG. 8C is a perspective view of a metal unit 880 according to an embodiment of the invention. It should be understood that if adjustments are made based on the aforementioned six-point interconnection, the planar metal units 460, 470 and 480 of FIG. 4A, FIG. 4B and FIG. 4C will be modified to the 3D metal units 860, 870 and 880 of FIG. 8A, FIG. 8B and FIG. 8C, respectively.

Figure 9:
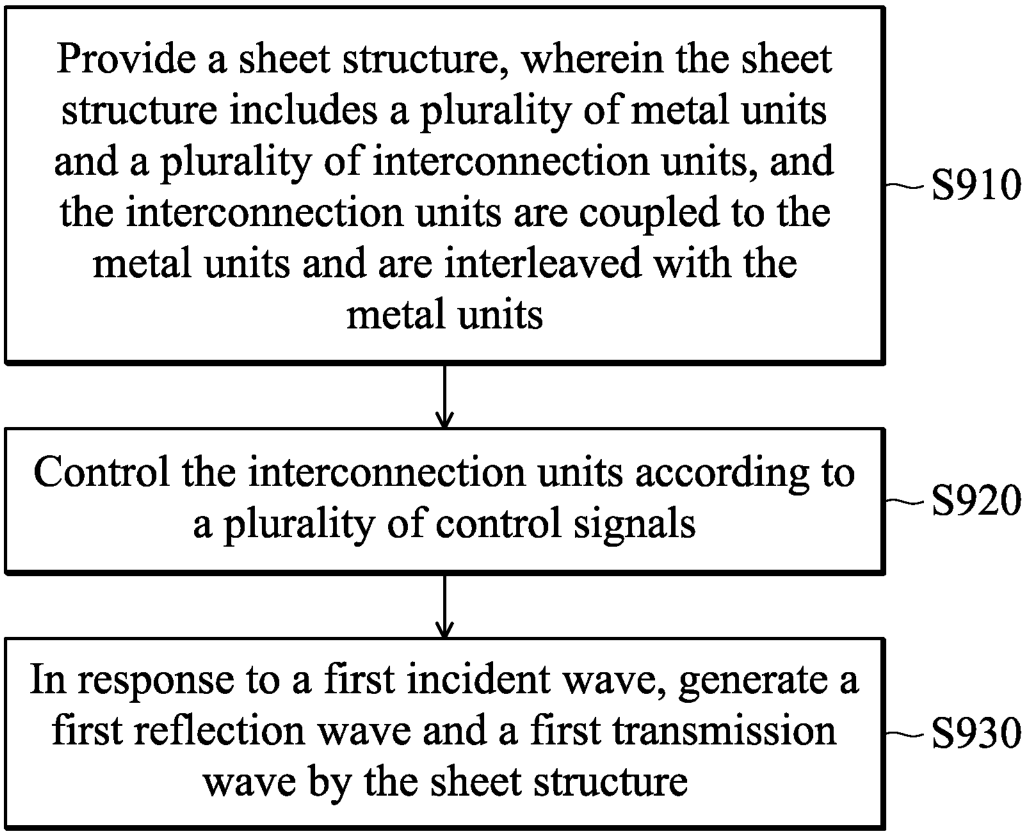
FIG. 9 is a flowchart of a communication method according to an embodiment of the invention.

FIG. 9 is a flowchart of a communication method according to an embodiment of the invention. In step S910, a sheet structure is provided. The sheet structure includes a plurality of metal units and a plurality of interconnection units. The interconnection units are coupled to the metal units, and are interleaved with the metal units. In step S920, the interconnection units are controlled according to a plurality of control signals. In step S930, in response to a first incident wave, a first reflection wave and a first transmission wave are generated by the sheet structure. It should be understood that these steps are not required to be performed in order, and every feature of the embodiments of FIGS. 1 to 8 may be applied to the communication method of FIG. 9.

The invention proposed a novel communication device and a novel communication method thereof. In comparison to the conventional design, the invention at least has the advantages of adjusting the radiation characteristics of reflection waves and transmission waves, improving the overall communication quality, and reducing the whole power consumption. Therefore, the invention is suitable for application in a variety of devices.

Note that the above element parameters are not limitations of the invention. A designer can fine-tune these setting values according to different requirements. It should be understood that the communication device and the communication method of the invention are not limited to the configurations of FIGS. 1-9. The invention may include any one or more features of any one or more embodiments of FIGS. 1-9. In other words, not all of the features displayed in the figures should be implemented in the communication device and the communication method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A communication device, comprising:

a sheet structure, comprising:

a plurality of metal units; and a plurality of interconnection units, coupled to the metal units, and interleaved with the metal units, wherein the interconnection units are controlled according to a plurality of control signals;

wherein in response to a first incident wave, the sheet structure generates a first reflection wave and a first transmission wave;

wherein the sheet structure has an operational frequency band from 30 GHz to 300 GHz.

2. The communication device as claimed in claim 1, wherein a first reflection ratio and a first reflection angle of the first reflection wave are adjustable according to the control signals.

3. The communication device as claimed in claim 1, wherein a first transmission ratio and a first transmission angle of the first transmission wave are adjustable according to the control signals.

4. The communication device as claimed in claim 1, wherein in response to a second incident wave, the sheet structure further generates a second reflection wave and a second transmission wave.

5. The communication device as claimed in claim 4, wherein the sheet structure is divided into a first region and a second region, and the second region is different from the first region.

6. The communication device as claimed in claim 5, wherein when the first region receives the first incident wave, the first region correspondingly outputs the first reflection wave and the first transmission wave.

7. The communication device as claimed in claim 5, wherein when the second region receives the second incident wave, the second region correspondingly outputs the second reflection wave and the second transmission wave.

8. The communication device as claimed in claim 4, wherein a second reflection ratio and a second reflection angle of the second reflection wave are adjustable according to the control signals.

9. The communication device as claimed in claim 4, wherein a second transmission ratio and a second transmission angle of the second transmission wave are adjustable according to the control signals.

10. The communication device as claimed in claim 1, wherein each of the metal units comprises:

a main metal element; and a plurality of connection terminals, wherein the main metal element is substantially surrounded by the connection terminals.

11. The communication device as claimed in claim 10, wherein the connection terminals are directly coupled to the main metal element.

12. The communication device as claimed in claim 10, wherein the connection terminals are adjacent to the main metal element, and do not directly touch the main metal element.

13. The communication device as claimed in claim 1, wherein each of the interconnection units comprises:

one or more circuit elements; and a plurality of interconnection terminals, coupled to the circuit elements.

14. The communication device as claimed in claim 13, wherein the circuit elements comprise a switch element.

15. The communication device as claimed in claim 13, wherein the circuit elements comprise a variable capacitor.

16. The communication device as claimed in claim 13, wherein the circuit elements comprise a tunable impedance circuit.

17. The communication device as claimed in claim 13, wherein the circuit elements comprise a passive element.

18. The communication device as claimed in claim 17, wherein the passive element is made of a dielectric material.

19. A communication method, comprising the steps of:

providing a sheet structure, wherein the sheet structure comprises a plurality of metal units and a plurality of interconnection units, and the interconnection units are coupled to the metal units and are interleaved with the metal units;

controlling the interconnection units according to a plurality of control signals; and in response to a first incident wave, generating a first reflection wave and a first transmission wave by the sheet structure;

wherein the sheet structure has an operational frequency band from 30 GHz to 300 GHz.

* * * * *